(12) United States Patent
Khlif

(10) Patent No.: US 6,662,069 B1
(45) Date of Patent: Dec. 9, 2003

(54) SLIDER HAVING INDEPENDENTLY CONTROLLED CROWN AND CROSS CURVATURE AND METHOD OF CONTROLLING CURVATURE

(75) Inventor: Mohamed-Salah H. Khlif, Fridley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/579,316

(22) Filed: May 25, 2000

Related U.S. Application Data
(60) Provisional application No. 60/194,928, filed on Apr. 6, 2000.

(51) Int. Cl.[7] .............................................. G06F 19/00
(52) U.S. Cl. ..................................... 700/117; 29/603.12
(58) Field of Search .......................... 29/603.01, 603.12; 369/300; 700/117; 219/121.85

(56) References Cited

U.S. PATENT DOCUMENTS

| | | | | |
|---|---|---|---|---|
| 4,835,361 A | * | 5/1989 | Strom | 219/121.68 |
| 4,910,621 A | | 3/1990 | Matsuda et al. | 360/104 |
| 4,914,868 A | * | 4/1990 | Church et al. | 29/603.09 |
| 5,220,471 A | | 6/1993 | Matsuzaki | 360/103 |
| 5,237,476 A | | 8/1993 | Bischoff et al. | 360/126 |
| 5,256,850 A | | 10/1993 | Maegawa et al. | 219/121.69 |
| 5,266,769 A | * | 11/1993 | Deshpande et al. | 219/121.69 |
| 5,303,105 A | | 4/1994 | Jorgenson | 360/106 |
| 5,442,850 A | * | 8/1995 | Kerth | 29/603.12 |
| 5,953,125 A | * | 9/1999 | de Groot | 356/492 |
| 5,982,583 A | * | 11/1999 | Strom | 360/234.3 |
| 6,073,337 A | * | 6/2000 | Strom | 29/603.12 |
| 6,075,604 A | * | 6/2000 | Crawforth et al. | 356/600 |
| 6,108,170 A | * | 8/2000 | Crawforth et al. | 360/234.3 |
| 6,288,873 B1 | * | 9/2001 | Lundquist et al. | 360/234.6 |
| 6,295,719 B1 | * | 10/2001 | Strom | 29/603.12 |
| 6,321,440 B1 | * | 11/2001 | Crawforth et al. | 219/121.69 |
| 6,441,385 B1 | * | 8/2002 | Khlif | 250/548 |
| 6,501,048 B1 | * | 12/2002 | Strom | 219/121.85 |
| 6,552,302 B2 | * | 4/2003 | Matsushita | 219/121.85 |

OTHER PUBLICATIONS

Photograph of TDK TPC ABS slider from Quantum Fireball 2 Drive, publicly on sale at least as early as Jan. 1, 1996.
Photograph of TDK AAB slider from Pike Disc Drive, publicly on sale at least as early as Jan. 31, 1996.
R.W. Stinnett and E.L. Neau "Ion Beam Surface Treatment", QM Technologies Inc. *An Interim Report*, Summer 1996, pp. 1–16.
R. Ebbutt and S. Danyluk, Ilan Weisshaus, "Method to Evaluate Damage Induced By Dicing and Laser Cutting of Silicon Wafers".

* cited by examiner

*Primary Examiner*—Leo Picard
*Assistant Examiner*—Alexander Kosowski
(74) *Attorney, Agent, or Firm*—Westman, Champlin & Kelly

(57) ABSTRACT

An apparatus and method for controlling cross and crown curvatures of a bearing surface is provided. The apparatus obtains a measure of the cross and crown curvatures. Material stresses are altered in a working surface of the slider within a cross curvature adjust area based on the measure of the cross curvature. The cross curvature adjust area is defined such that altering material stresses within the cross curvature adjust area induces a change in the cross curvature while inducing substantially no change in the crown curvature. Material stresses are altered in the working surface of the slider within a crown curvature adjust area based on the measure of the crown curvature. The crown curvature adjust area is defined such that altering material stresses within the crown curvature adjust area induces a change in the crown curvature while inducing substantially no change in the cross curvature.

17 Claims, 12 Drawing Sheets

SLIDER HAVING INDEPENDENTLY CONTROLLED CROWN AND CROSS CURVATURE AND METHOD OF CONTROLLING CURVATURE

CROSS-REFERENCE TO RELATED APPLICATION

This application claims priority from U.S. Provisional Application No. 60/194,928, filed Apr. 6, 2000, and entitled "CONTINUOUS WAVE LASER-INDUCED ADJUST OF A SLIDER FLATNESS."

Cross-reference is also made to U.S. application Ser. No. 09/546,836, filed Apr. 11, 2000, and entitled "SLIDER HAVING THERMALLY APPLIED TENSILE STRESS FOR CURVATURE CONTROL AND METHOD OF APPLYING TENSILE STRESS," and U.S. Provisional Application No. 60/201,241, filed May 1, 2000, and entitled "A METHOD FOR TWIST CONTROL ON A MAGNETIC HEAD SLIDER".

FIELD OF THE INVENTION

The present invention is related to disc drive data storage systems and, more particularly, to a method of controlling curvature of a transducing head, such as a hydrodynamic bearing slider.

BACKGROUND OF THE INVENTION

Disc drives of the "Winchester" type are well known in the industry. Such drives use rigid discs coated with a magnetizable medium for storage of digital information in a plurality of circular, concentric data tracks. The discs are mounted on a spindle motor, which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which urges the head gimbal assembly toward the disc surface.

The head gimbal assembly includes a gimbal and a slider. The gimbal is positioned between the slider and the load beam to provide a resilient connection that allows the slider to pitch and roll while following the topography of the disc. The slider includes a slider body having a bearing surface, such as an air bearing surface, which faces the disc surface. As the disc rotates, the air pressure between the disc and the air bearing surface increases, which creates a hydrodynamic lifting force that causes the slider to lift and fly above the disc surface. The preload force supplied by the load beam counteracts the hydrodynamic lifting force. The preload force and the hydrodynamic lifting force reach an equilibrium which determines the flying height of the slider. The transducer is typically mounted at or near the trailing edge of the slider.

In some applications, the slider flies in close proximity to the surface of the disc. This type of slider is known as a "pseudo-contact" slider, since the bearing surface of the slider can occasionally contact the surface roughness of the disc. In other applications, the slider is designed to remain in direct contact with the disc surface with substantially no air bearing. These sliders are referred to as "contact recording" sliders.

It is often desirable to fabricate a slider such that the bearing surface has a positive curvature along the length and width of the slider. Length curvature is known as crown curvature. Width curvature is known as cross or camber curvature. The proper setting and control of crown and cross curvature improves flying height variability over varying conditions, improves wear on the slider and the disc surface, and improves takeoff performance by reducing stiction between the slider and the disc surface. In a typical slider fabrication process, crown or cross curvature is created by lapping the bearing surface on a spherically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances. More efficient and controllable methods of effecting air bearing surface curvature are desired.

U.S. Pat. No. 5,442,850 discloses a method of controlling curvature by inducing a preselected amount of compressive stress within a selected section of the bearing surface by impinging the section with particles for a preselected amount of time. U.S. Pat. No. 5,266,769 discloses a process of controlling slider curvature in which the air bearing surfaces are first patterned and then a chosen pattern of stress is produced on the back side of the slider by laser oblation or sand blasting to selectively remove stressed material and thereby create a desired crown and cross curvature of the bearing surface.

U.S. Pat. No. 4,910,621 discloses a method of producing curvature in a slider by creating a groove in the leading edge of the slider, placing a sealing material in the groove and then melting and stiffening the sealing material in the groove. The sealing material has an adhesive property upon melting and a shrinking property upon stiffening which causes lengthwise curvature at the leading edge of the slider. U.S. Pat. No. 5,220,471 discloses a slider having a longitudinal linear groove formed in a surface which is opposite the disc-opposing surface. The groove creates tensile stresses which cause the disc-opposing surface of the slider to be a curved surface in a convex form.

U.S. Pat. No. 5,982,583 discloses a method of effecting slider curvature through the application of laser-induced anisotropic tensile stress, which allows one of the crown and cross curvature to be changed to a greater extent than the other curvature. In addition, Seagate Technology, Inc. has used a process of creating scratches on the back side of the slider (the side opposite to the air bearing), lapping the bearing surface flat and then laser heat treating the scratches to reduce compressive stress caused by the scratches and thereby cause a positive curvature change in the bearing surface. This process is discussed in U.S. application Ser. No. 08/662,849, Filed Jun. 12, 1996.

While the above methods improve curvature control, these methods are still not entirely effective in accurately and independently achieving desired curvature values for both crown and cross curvature on the same slider.

SUMMARY OF THE INVENTION

One aspect of the present invention is directed to a method of controlling cross and crown curvatures of a bearing surface of a disc head slider. In the method, a measure of the cross and crown curvatures is obtained. Material stresses are altered in a working surface of the slider within a cross curvature adjust area based on the measure of the cross curvature. The cross curvature adjust area is defined such that altering material stresses within the cross curvature adjust area induces a change in the cross curvature while inducing substantially no change in the crown curvature. Material stresses are altered in the working surface of the slider within a crown curvature adjust area based on the measure of the crown curvature. The crown curvature adjust area is defined such that altering material stresses within the crown curvature adjust area induces a change in the crown curvature while inducing substantially no change in the cross curvature.

Another aspect of the present invention is directed to a method of adjusting cross and crown curvatures on a bearing surface of a disc head slider, which has a back surface that is opposite to the bearing surface, leading and trailing edges, first and second side edges, a longitudinal axis and a transverse axis. A first number of laser scan lines are selectively formed on the back surface, parallel to the transverse axis and within each of first and second rectangular cross curvature adjust bands, as a function of a measure of the cross curvature. The first and second rectangular cross curvature adjust bands are defined along the leading and trailing edges, respectively, of the working surface and peripheral to a central area of the working surface. A second number of laser scan lines are selectively formed on the back surface, parallel to the longitudinal axis and within each of first and second rectangular crown curvature adjust bands, as a function of a measure of the crown curvature. The first and second rectangular crown curvature adjust bands are defined along the first and second side edges, respectively, of the working-surface and peripheral to the central area of the working surface.

Yet another aspect of the present invention is directed to an apparatus for controlling cross and crown curvatures of a bearing surface of a disc head slider. The apparatus includes a light source adapted to produce a light beam capable of altering material stresses in a working surface of the slider. A device is coupled to the light source for scanning the light beam across the working surface in a pattern. The pattern is selected to alter material stresses in the working surface within a cross curvature adjust area so as to induce a change in the cross curvature while inducing substantially no change in the crown curvature and within a crown curvature adjust area on the working surface so as to induce a change in the crown curvature while inducing substantially no change in the cross curvature.

DETAILED DESCRIPTION OF ILLUSTRATIVE EMBODIMENTS

Figure 1:
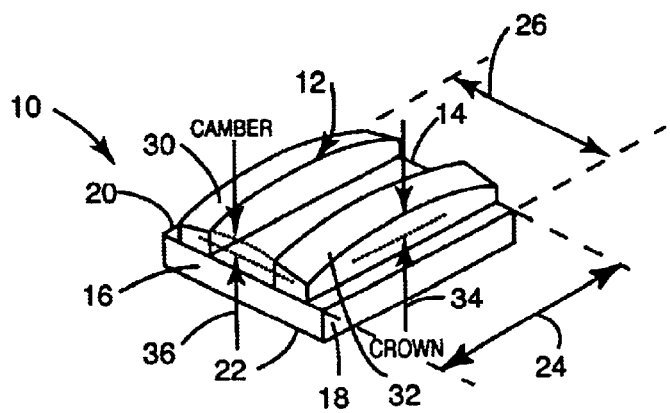
FIG. 1 is a perspective view of a disc head slider, as viewed from a bearing surface, which illustrates cross and crown curvature.

FIG. 1 is a perspective view of a disc head slider 10, as viewed from a bearing surface 12. Slider 10 has a leading edge 14, a trailing edge 16, side edges 18 and 20 and back surface 22. Slider 10 has a length 24, measured from leading edge 14 to trailing edge 16, and a width 26, measured from side edge 18 to side edge 20. In the embodiment shown in FIG. 1, bearing surface 12 includes side rails 30 and 32. However, slider 10 can include a variety of bearing surface geometries. These surface geometries can be configured for non-contact, direct-contact or pseudo-contact recording. Slider 10 carriers a read/write transducer (not shown), which is typically mounted along trailing edge 16, but can be positioned at other locations on slider 10 in alternative embodiments.

Slider 10 preferably has a positive curvature along length 24 and width 26. "Crown" curvature is a measure of the curvature of bearing surface 12 along length 24. Crown curvature is negative for a concave surface, positive for a convex surface and zero for a flat surface. "Cross" curvature is a measure of the curvature of bearing surface 12 along width 26. The sign of the cross curvature has the same convention as the sign of the crown curvature. Cross curvature is also known as "camber" curvature. A common method of measuring the crown and cross curvatures is to measure the differences 34 and 36 between the highest points along length 24 and width 26 and the lowest points along length 24 and width 26. Typical crown and cross curvatures are on the order of zero to 1.5 microinches for a "30 series" slider having a length of 49 mills and a width of 39 mills.

Figure 2:
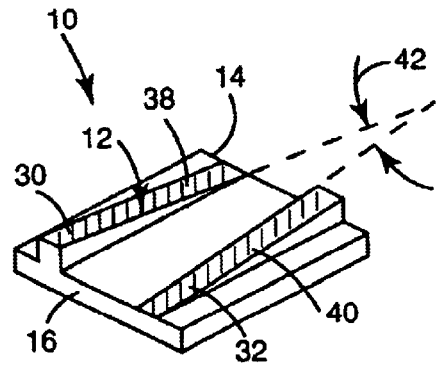
FIG. 2 is a perspective view of a disc head slider as viewed from a bearing surface, which illustrates twist curvature.

Along with a positive crown and cross curvature, it is often desired that slider 10 has no "twist". Twist is the tilt between rails 30 and 32, along slider length 24, which can be caused by stresses in the slider substrate material. FIG. 2 is a perspective view of slider 10 illustrating twist along slider length 24. The amount of twist can be measured by fitting planes 38 and 40 to the bearing surfaces of rails 30 and 32 and measuring an angle 42 between the fitted planes 38 and 40. The sign of angle 42 indicates the direction of twist and the relative orientation of the rails to each other.

Figure 3:
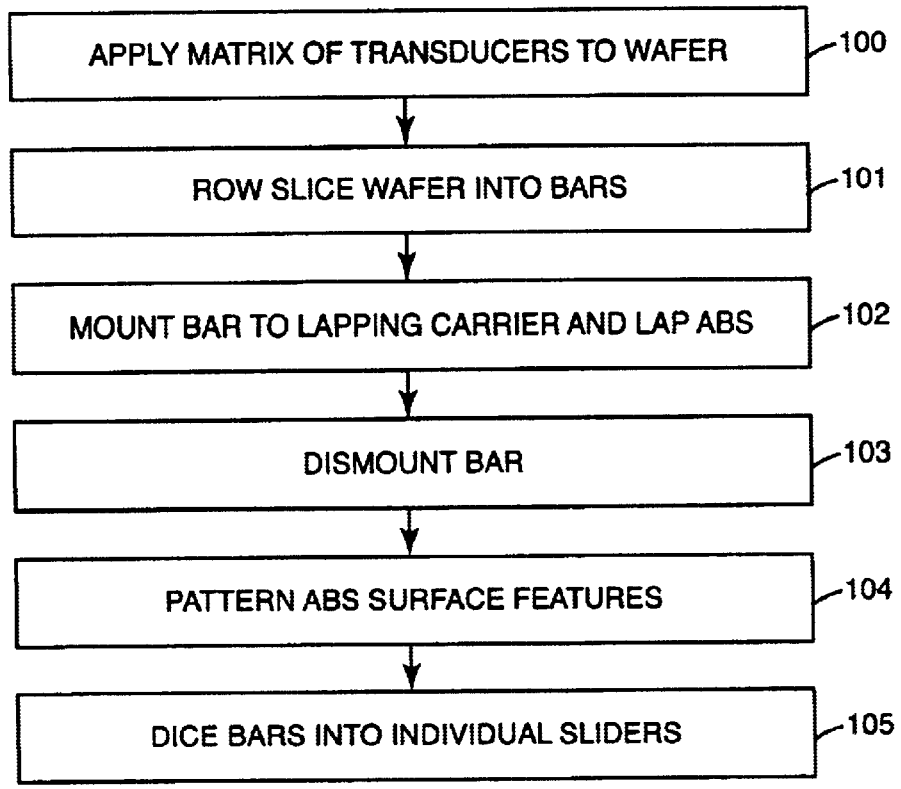
FIG. 3 is a flow chart illustrating a slider fabrication process according to one embodiment of the present invention.

The crown curvature, cross curvature and twist are controlled according to the present invention during fabrication of the slider body. FIG. 3 is a flow chart illustrating a slider fabrication process according to one embodiment of the present invention. The slider body is formed from a substrate known as a wafer. At step 100, a matrix of transducers is applied to the top surface of the wafer. At step 101, the wafer is sliced along rows into a plurality of bars. The slicing operation is typically performed with a diamond-tipped saw blade or wheel. Each bar includes a plurality of individual slider bodies, with each slider body having a corresponding transducer. The sliced surfaces become bearing surface 12 and back surface 22, while the top surface of the wafer becomes trailing edge 16 of each slider body. The slicing process induces surface stress in bearing surface 12 and back surface 22 due to plastic deformation of the surfaces. This surface stress is typically compressive. In addition, the slicing wheel can form marks in bearing surface 12 and back surface 22 due to mis-alignment of the wheel and wheel vibration. Therefore, following the slicing operation, bearing surface 12 and back surface 22 are referred to as "rough sliced surfaces."

At step 102, each bar is mounted to a carrier, and the bearing surface 12 of each bar is machined by a lapping process prior to forming the bearing features. The lapping process is controlled to obtain a target throat height or target resistance for each transducer. At step 103, the bar is dismounted from the lapping carrier. At step 104, the bearing surface features are patterned by ion milling, chemical etching or reactive ion etching (RIE), for example, with one or more masking operations. Once the bearing surface features have been formed, the bars are diced along a plurality of diced lanes into individual slider bodies, at step 105. The diced surfaces become side edges 18 and 20, shown in FIG. 1. The dicing operations can also induce surface stress in side edges 18 and 20. The stresses in the slider substrate material following the above fabrication steps cause each slider body to have some initial or "incoming" curvature, which is typically not a desired curvature. The initial crown and cross curvatures are then adjusted by altering the surface stresses on each slider according to the present invention.

Figure 4:
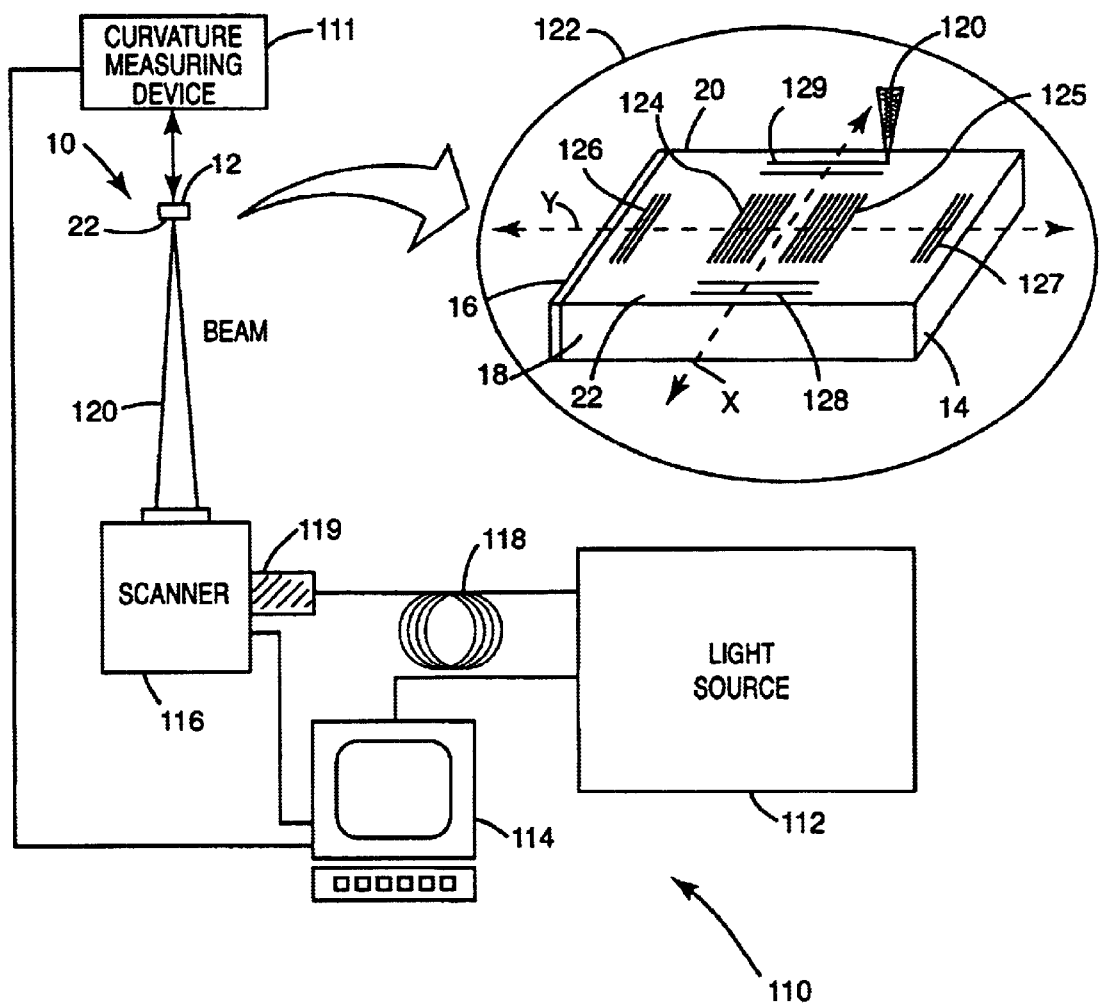
FIG. 4 is a diagram of an apparatus for adjusting the crown and cross curvature according to one embodiment of the present invention.

FIG. 4 is a diagram of an apparatus 110 for adjusting the crown and cross curvatures of each slider 10 toward target curvature values according to predetermined specifications. Apparatus 110 includes curvature measuring device 111, light source 112, programmed computer 114, and scanner 116. Programmed computer 114 operates measuring device 111, light source 112, and scanner 116 according to a sequence of instructions stored in a memory (not shown), which is associated with the computer, and user commands provided by a user through a user interface (also not shown). The sequence of instructions, when executed by computer 114, cause apparatus 110 to measure the crown and cross curvature of bearing-surface 12 with curvature measuring device 111 and then alter the surface stresses on the back surface 22 (or alternatively bearing surface 12) of slider 10, based on the curvature measurements, the predetermined target curvatures for slider 10 and predetermined curvature response characteristics. In one embodiment of the present invention, apparatus 110 has one or more slider "nests" (not shown), wherein each nest holds a plurality of sliders 10 for treatment. Each slider is sequentially moved into a working position relative to light beam 120 and curvature measuring device 111. Measuring device 111 can include an interferometer, for example, which is capable of producing accurate and repeatable curvature measurements (i.e. "gage capable").

Apparatus 110 alters the surfaces stresses on back surface 22 by scanning light beam 120 across back surface 22 of slider 10 in a selected pattern that is chosen to achieve a desired curvature change in bearing surface 12. In one embodiment, light source 112 is a fiber laser source, which generates coherent light having continuous power at a wavelength of about 1100 nm, which is delivered to scanner 116 over a 5 micrometer fiber-optic cable 118, for example.

Fiber-optic cable 118 is coupled to scanner 116 through a system of lenses 119, which expand the 0.5 mm diameter beam to a collimated beam of about 8 mm in diameter, for example. Scanner 116 passes the 8 mm beam through a two-axis galvanometer and then focuses the beam on back surface 22 through a flat-field objective lens. The two-axis galvanometer includes a set of two mirrors that allow planar x-y motion of the focused beam on the work surface of slider 10.

As beam 120 is scanned along the working surface of slider 10, the laser beam melts back surface 22 along the scan line, which reduces or eliminates preexisting compressive stresses along the scan line. When the molten material solidifies, new anisotropic tensile stress is added to back surface 22. The added anisotropic tensile stress causes the slider substrate to bulge from the surface opposite to the surface being treated. Thus, treatment on back surface 22 causes a controlled change in the crown and cross curvatures on bearing surface 12 and vice versa. The wavelength of beam 120 is preferably near the infrared region and provides for enough heating of back surface 22 without material removal. With a continuous wave laser beam, the tensile stress induced during cooling of the substrate material is aligned predominantly parallel to the scan direction.

An example of a laser scan pattern applied by scanner 116 according to one embodiment of the present invention is shown in detail area 122. As discussed in more detail below, beam 120 is operated to provide very localized stress management on back surface 22 in a pattern that is capable of substantially de-coupling the adjustments of crown and cross curvature from one another. The laser scan pattern can be applied in one step or a sequence of steps, which are interleaved with one or more curvature measurements. For example, one or more scan lines 124 and 125 can be applied in a central region of back surface 22 in a direction parallel to transverse slider axis "X" to provide a coarse adjustment of the crown and cross curvatures. In this area, the crown and cross curvature responses (i.e. resulting changes in curvature due to an applied scan line) are somewhat coupled to one another, as described in more detail below. The number and spacing of scan lines 124 and 125 can be controlled to achieve a desired initial change in crown and cross curvature.

The crown and cross curvatures can again be measured, and any final curvature changes can be made by applying one or more scan lines along the periphery of back surface 22. For example, it has been found that the cross curvature can be adjusted with substantially no change in the crown curvature by applying one or more scan lines 126 and 127 in the peripheral areas near leading and trailing edges 14 and 16, in a direction parallel to transverse axis X. Similarly, it has been found that the crown curvature can be adjusted with substantially no change in the cross curvature by applying one or more scan lines 128 and 129 in the peripheral areas near side edges 18 and 20, in a direction parallel to longitudinal axis Y. Again, the number and spacing of the scan lines 126, 127, 128 and 129 can be controlled to achieve a desired final change in the crown and cross curvatures.

1. Pre-Existing Conditions That Influence The Curvature Response Seen by Apparatus 110

There are numerous pre-existing conditions that influence the curvature response in bearing surface 12 from the scan lines produced by beam 120. These conditions include the post-slice surface condition of the slider, the slicing wheel type, the laser and scanner settings, the type of slider substrate material, the slider-burn pattern alignment, status of the slider as a "rework" or "non-rework" slider, the desired crown and cross curvature targets and flatness distribution among incoming sliders.

With respect to the post-slice surface condition of a particular slider, row slice surfaces (the bearing surface and the back surface) that show rough marks tend to absorb more of the laser power. Thus, the heat affected zone of each scan line will be wider, resulting in a proportionally greater response in the curvature change. In a typical process, rough sliders may constitute less than 5% of all sliders treated by apparatus 110. High curvature responses can be attributed to excessive shear stresses produced during the slicing operation. For example, some rough sliders have been observed to have a curvature response that is 100% greater than a normal curvature response. The algorithm implemented by computer 114 significantly reduces the effects of variations in the post-slice surface condition.

The type of wheel used for slicing the wafer into bars of slider bodies produces unique surface conditions on the slider body following the slicing operation. For example, one wheel type may produce a surface that is fairly homogenous, but may remove a large amount of compressive surface stress on which the laser heat treatment can act as compared to another wheel type.

The power setting on the laser and the speed setting on the scanner also greatly influence the resulting curvature change. In one embodiment, neither the power nor the speed is used as a process variable for effecting a desired curvature change since the response is insensitive to changes in power and speed beyond certain values. In addition, at lower speed values, the burn pattern dimensions are extremely sensitive to changes in scanning speed due to the small area of the slider's back surface. Using either of these variables as a process variable may result in unstable design functions since the burn lines change both in depth and width for each new value of the variable. Thus, a two-dimensional change can not be predicted by one variable.

The substrate type also influences the curvature response for a given laser treatment. For, example, a typical slider is formed from a substrate of $Al_2O_3$—TiC. If the substrate type is changed, new power and scanning speed settings may be required, along with new design functions (i.e. design curves) and/or a new laser system may be needed.

Since the position of each laser scan line on the sliders back surface has an effect on the resulting curvature change, variations in alignment from one slider to the next will also influence the curvature response. The curvature control algorithm implemented by computer 114 accounts for alignment variations. The sources of alignment variations includes tolerances from one nest to the next and from one apparatus to the next. For nest-to-nest variations, a cross pattern is burned at the center of a slider for all five nests. The x and y offsets that are used to position the cross at the center of the slider are stored in a parameter file used by computer 114. These off-sets are then used for aligning the subsequent burn patterns for the sliders of each specific nest. Since the locations of different blocks of the apparatus can vary from one machine to the next these x and y off-sets are machine specific. However, the relative locations of the burn patterns on back side 22 are not specific and need not be changed.

The combination of crown and cross curvature targets influences yield in general. For example, given the typical dimensions of a slider, it is difficult to achieve a low crown curvature target and a high cross curvature target. Also, the curvature distribution of incoming sliders is an important factor in determining the capability of meeting certain curvature goals for all incoming sliders. The incoming curvature distribution also effects process sigma and yield. The incoming curvature distribution is effected by lapping, and variations in the lapping process are translated to a wider and shifted curvature distribution.

2. Adjustment Capability of Apparatus 110

Figure 5:
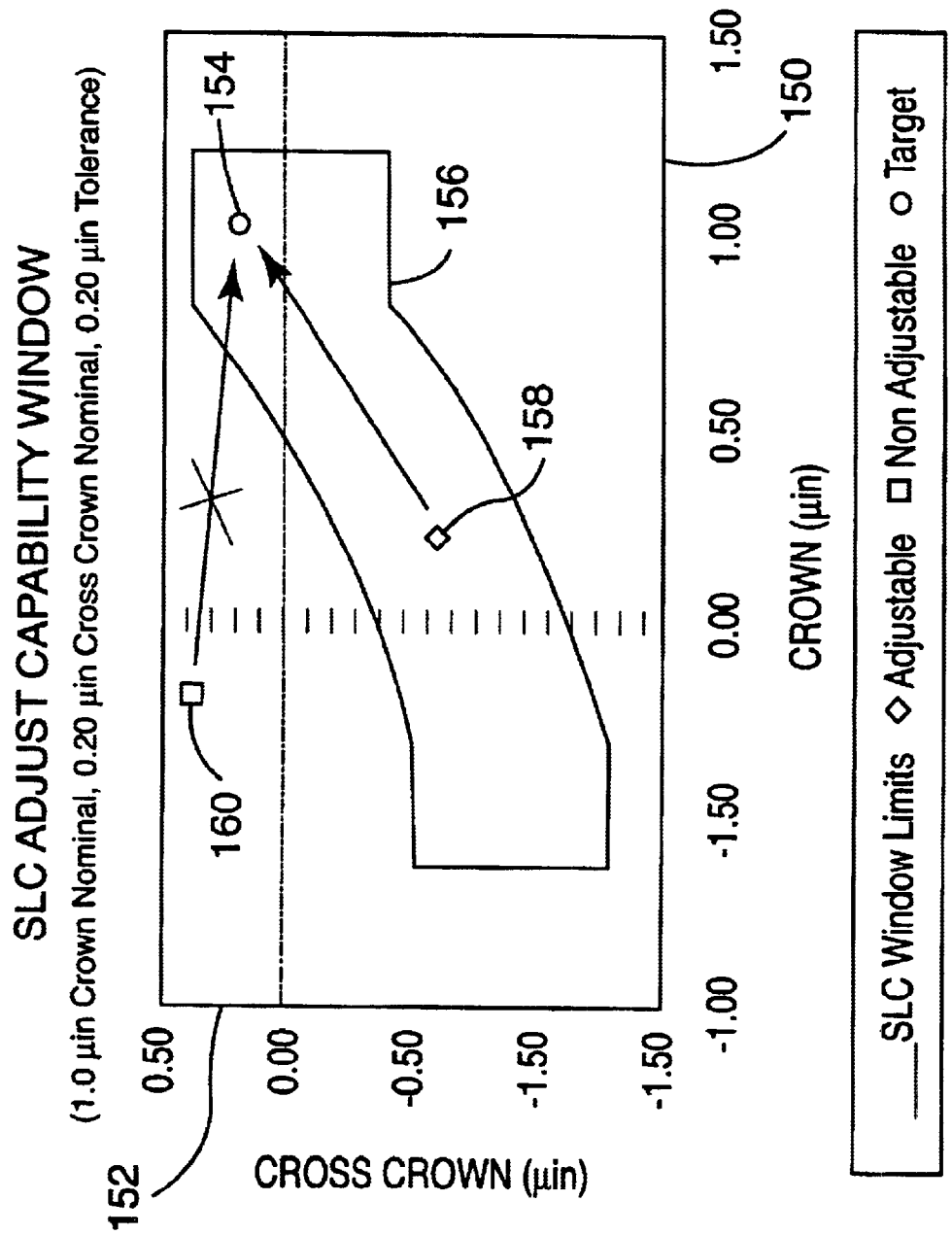
FIG. 5 is a graph illustrating an example of a crown and cross curvature adjustment capability window for the apparatus shown in FIG. 4.

FIG. 5 is a graph illustrating a crown and cross curvature adjustment capability window for apparatus 110 according to one embodiment of the present invention. X-axis 150 represents the crown curvature of a slider in microinches and Y-axis 152 represents the cross curvature of the slider in microinches. Point 154 represents a desired final crown and cross curvature target for each slider, which is based on predetermined specifications. In one embodiment, the desired final crown and cross curvature targets are 1.0 microinches and 0.20 microinches, respectively, with a 0.20 microinch tolerance.

Window 156 is a processing capability window, which represents the initial crown and cross curvature values that can be adjusted with apparatus 110 to meet the specified target 154. For example, point 158 represents a slider within window 156 in which the incoming crown and cross curvature can be adjusted to reach target 154. In contrast, point 160 represents a slider outside of window 156. As a result, apparatus 110 is not capable of adjusting the incoming crown and cross curvatures so that both curvatures reach target 154. If an incoming slider has crown or cross curvature values outside of window 156, apparatus 110 sets a user notification flag that indicates the slider cannot be adjusted to reach the predetermined curvature specifications.

The processing capability range represented by window 156 is determined by the maximum changes in crown and cross curvature values that can be achieved by laser-induced changes in the material stresses on the incoming slider. As discussed above, these stresses are caused by prior slider fabrication processes, such as slicing, mounting and lapping. The particular curvature values and processing capability range shown in FIG. 5 are provided as examples only and can vary in alternative embodiments. The processing capability range represented by window 156 depends on various conditions, such as the type of substrate material, the type of laser used and other factors. The size of window 156 can be influenced by future slicing technology, the slicing wheel type, the use of other curvature control methods, lapping techniques, and imposed process tolerances.

3. Scan Line Sensitivity to Location on Substrate

Figure 6:
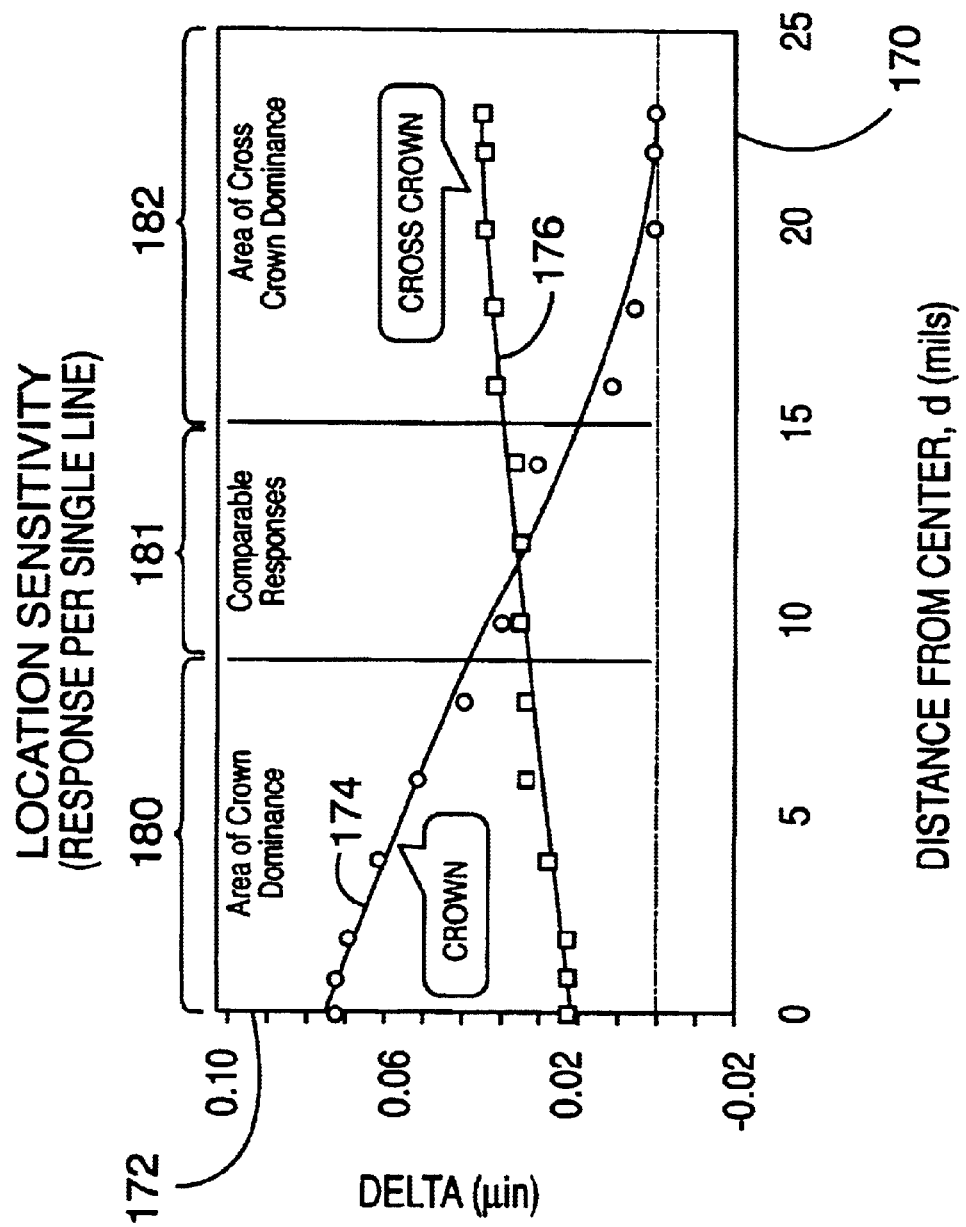
FIG. 6 is a graph which illustrates sensitivity of a slider's curvature response to the location of a continuous wave laser beam treatment on the slider substrate.

It has been found that the curvature response to a continuous wave laser beam is sensitive to the treatment location on the slider substrate. FIG. 6 is a graph which illustrates this sensitivity. X-axis 170 represents distance in mils ($1 \times 10^{-3}$ inches) along the slider length from the center of the slider substrate outwardly toward the leading and trailing edges. Y-axis 172 represents amplitude of curvature change in microinches for a pair of laser scan lines, which are symmetric about the slider's transverse axis and perpendicular to the slider's longitudinal axis (similar to lines 124–127 in FIG. 4). Line 174 represents the change in crown curvature, and line 176 represents the change in cross curvature.

In the area 180 from 0 mils to about 9 mils from the slider center, a single laser scan line results in a greater change in crown curvature than cross curvature. This central area is therefore an area in which the crown curvature response dominates the cross curvature response for a laser scan line extending perpendicular to the slider's longitudinal axis. In area 181 from about 9 mils to about 15 mils from the slider center, a single laser scan line oriented perpendicular to the slider's longitudinal axis results in comparable responses in the crown and cross curvatures. In area 182 from about 15 mils from the slider center to the leading and the trailing edges of the slider, the response in cross curvature dominates the response in crown curvature.

When the laser beam is scanned parallel to the longitudinal axis of the slider a similar behavior is obtained, but with the dominance regions being inverted for crown and cross curvatures. Thus, the cross curvature response is more dominant at the center of the slider, while the crown curvature response is more dominant at the areas adjacent to the side edges of the slider.

Given the predictable behavioral response shown in FIG. 6, an algorithm can be formed to define, for each incoming slider, a plurality of laser burn patterns that will adjust the crown and cross curvatures of the slider to the desired targets given the set of incoming crown and cross curvature values for that slider. Looking at FIG. 6, the areas 182 on the slider surface that are adjacent to the leading and trailing edges can provide for adjustment of cross curvature completely or nearly completely independent of any change in crown curvature. Likewise, the areas (similar to area 182 in FIG. 6) adjacent to the side edges of the slider can provide for adjustment of crown curvature without, or substantially without, any change in cross curvature. These areas are referred to as independent (or free) crown and cross curvature adjustment bands.

In the embodiment show in FIG. 6, the independent cross curvature bands in area 182 can have a maximum width of about 0.008 inches, as measured inwardly from the leading and trailing edges of the slider, for example. The independent crown curvature bands can have a maximum width of about 0.004 inches, as measured inwardly from the side edges of the slider, for example. These bands can be used to selectively apply laser scan lines. As more scan lines are needed to achieve a desired curvature change, the algorithm grows the bands inwardly from the edges of the slider up to the maximum band size (or width) imposed by the user.

The middle areas 180 and 181 of the slider surface, which are bounded by the independent bands, are areas in which the crown and cross curvature responses are coupled with one another. Any change in crown curvature will be accompanied by a change in cross curvature and vice versa. However, based-on the sensitivity graph shown in FIG. 6, the relative changes in crown and cross curvatures can still be controlled somewhat within the middle area. Laser scan lines positioned closer to the center of the slider in area 180 and oriented in a direction perpendicular to the slider's longitudinal axis will induce a greater change in crown curvature than cross curvature. However, the difference in crown and cross curvature responses reduces as the scan lines are progressively moved away from the center of the slider. Laser lines positioned in area 181 adjacent to the independent cross curvature bands will result in cross curvature responses that are more comparable to the crown curvature responses, but the amount of cross curvature change for each scan line decreases as the scan lines are moved towards the center of the slider.

Since the crown and cross curvature responses are coupled with one another in the middle areas of the slider, these areas can be used for an initial, or "coarse" adjustment of the crown and cross curvatures, whereas the independent crown and cross curvature areas can be used during a second, "fine" curvature adjustment step in one embodiment of the present invention.

Figure 7:
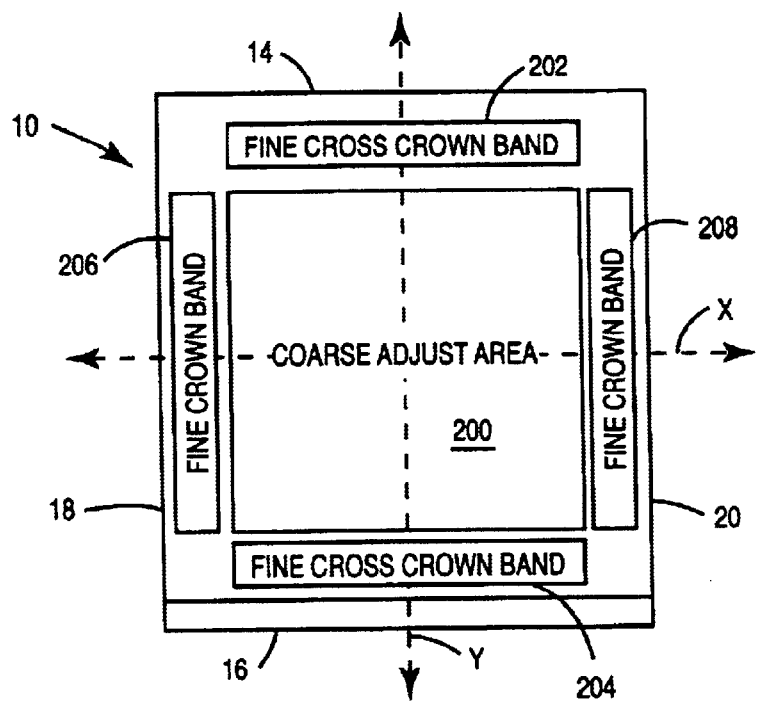
FIG. 7 is a diagram which illustrates the relative locations of coarse and fine curvature adjustment areas on the working surface of the slider.

FIG. 7 is a diagram which illustrates the relative locations of the coarse and fine curvature adjustment areas on the working surface of the slider. In the embodiment shown in FIG. 7, this working surface is back surface 22. However, this working surface can include bearing surface 12 in alternative embodiments of the present invention. The same reference numerals are used in FIG. 7 as were used in FIGS. 1, 2 and 4 for the same or similar elements. Slider 10 has a leading edge 14, a trailing edge 16, side edges 18 and 20, transverse axis X and longitudinal axis Y. The working surface of slider 10 is divided into a coarse adjust area 200, fine cross curvature bands 202 and 204 and fine crown curvature bands 206 and 208. Curvature adjustments in coarse adjust area 200 are made by forming one or more continuous wave laser scan lines across coarse adjust area 200 in a direction perpendicular to longitudinal slider axis Y (i.e. parallel to leading edge 14 and trailing edge 16). Fine cross curvature adjustments are made by forming continuous wave laser scan lines along fine cross curvature bands 202 and 204 in a direction perpendicular to longitudinal axis Y. Fine crown curvature adjustments are made by forming continuous wave laser scan lines along fine crown curvature bands 206 and 208 in a direction parallel to longitudinal axis Y. The cross curvature adjustments made in fine cross curvature bands 202 and 204 are made substantially independently of any change in the crown curvature, and the crown curvature adjustments made in fine crown curvature bands 206 and 208 are made substantially independently of any changes in cross curvature.

Figure 8:
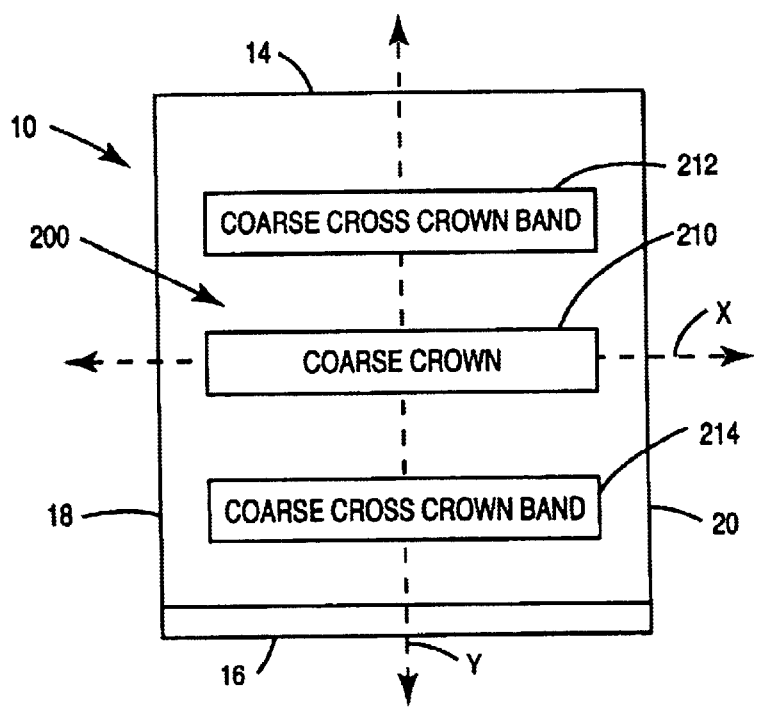
FIG. 8 is a diagram which illustrates the relative locations of three curvature adjustment bands within the coarse adjust area shown in FIG. 7.

Coarse adjust area 200 is divided into three bands in one embodiment of the present invention in order to take advantage of the differing curvature responses shown in FIG. 6. FIG. 8 shows the location of each of these three bands on the slider's working surface. Again, the same reference numerals are used in FIG. 8 as were used in FIG. 7 for the same or similar elements. Coarse adjust area 200 includes coarse crown band 210, at the midpoint of the slider's length, and coarse cross bands 212 and 214. Coarse crown band 210 corresponds to the crown area of dominance 180 shown in FIG. 6. Coarse cross bands 212 and 214 correspond to the left most portion of the area of cross curvature dominance in FIG. 6, between about 12 mils and about 15 mils along X-axis 170. The algorithm used to define the laser scan line pattern for a particular slider originates coarse cross bands 212 and 214 at an area close to fine cross bands 202 and 204 (shown in FIG. 7) and grows these bands inwardly as needed towards a central location within coarse adjust area 200. The algorithm originates coarse crown band 210 at a central location in coarse adjust area 200 and grows the band outwardly as needed toward coarse cross bands 212 and 214.

4. Curvature Adjustment Process Flow

Figure 9:
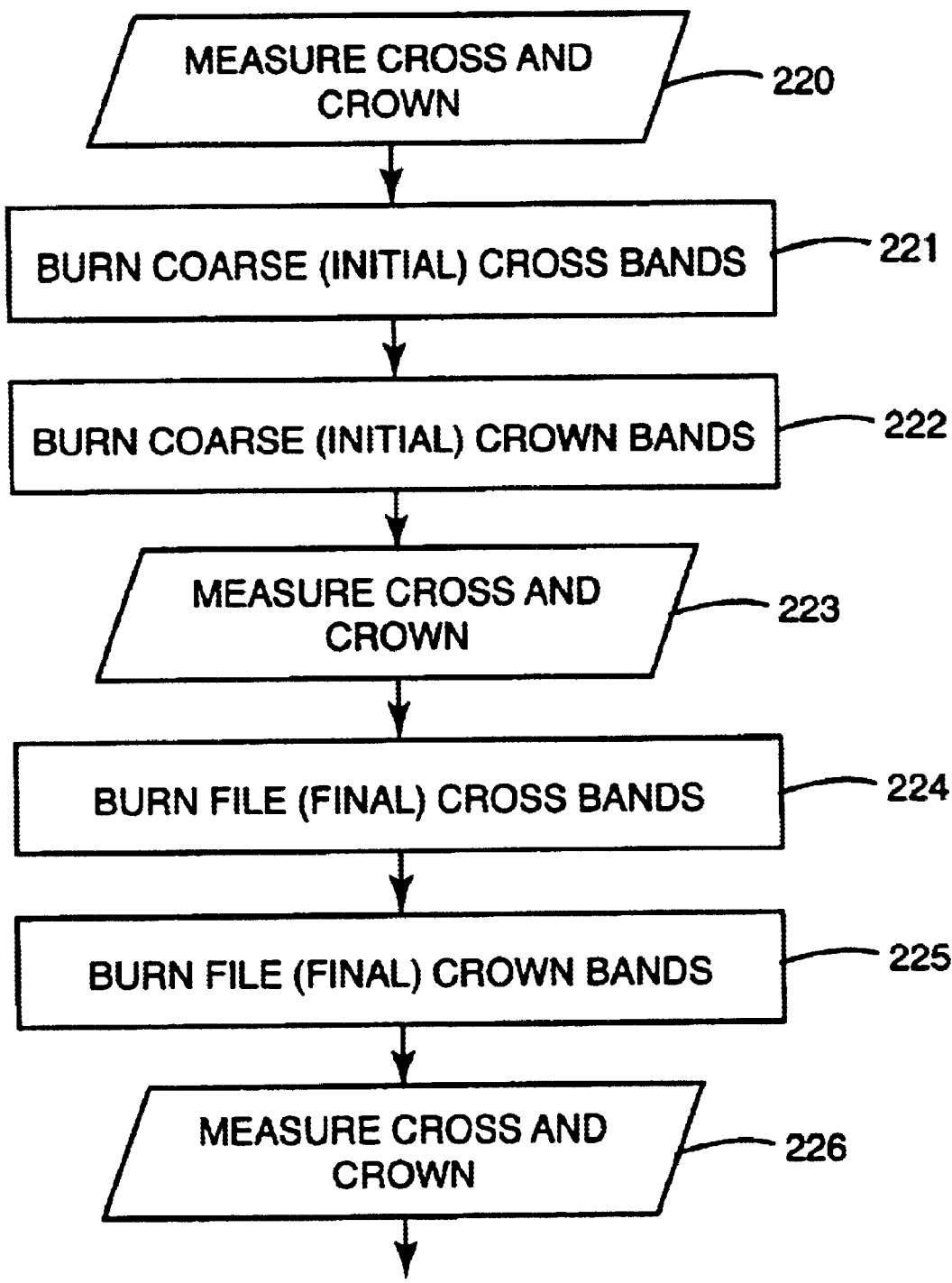
FIG. 9 is a flow chart, which illustrates the steps performed in a curvature control process according to one embodiment of the present invention.

FIG. 9 is a flow chart, which illustrates the steps performed in a curvature control process according to one embodiment of the present invention. At step 220, the algorithm implemented by apparatus 110 (shown in FIG. 4) operates curvature measuring device 111 to measure the incoming cross and crown curvature values of the slider being treated. Based on the measured incoming cross and crown curvature values and the predetermined final cross and crown curvature targets, the algorithm determines desired initial changes in the cross and cross curvature values and selects the patterns of laser scan lines in coarse cross bands 212 and 214 and coarse crown band 210 that will result in the desired initial curvature changes. The algorithm then operates light source 112 and scanner 116 (shown in FIG. 4) at steps 221 and 222 to burn the selected laser scan patterns within coarse cross bands 212 and 214 and coarse crown band 210, respectively.

At step 223, curvature measuring device 111 performs a second measurement of the cross and crown curvatures of the slider. Based on these measurements and the predetermined final cross and crown curvature targets, the algorithm selects the patterns of laser scan lines in fine cross bands 202 and 204 and fine crown bands 206 and 208 that will result in desired final curvature changes for reaching the final cross and crown curvature targets. The algorithm then operates light source 112 and scanner 116 (shown in FIG. 4) at steps 224 and 225 to burn the selected laser scan patterns within fine cross band 202 and 204 and fine crown bands 206 and 208, respectively. At step 226, curvature measuring device 111 makes a third measurement of the slider's crown and cross curvatures, which are compared to the predetermined customer specifications by computer 114.

5. Design Curves to Determine Mathematical Model for Curvature Adjustment

Design curves can be used to determine a mathematical model that can predict the outcome of a function based on input variables to the model. For the process of adjusting the curvature of a magnetic or optical head slider, the desired outcome is crown and cross curvature magnitudes. The input variables to this process include all process factors that can be adjusted individually or collectively in order to bring about the desired outcome. Given a constant slider substrate material, these input variables include laser operating mode, laser power, focused laser beam spot size, laser beam scanning speed, scanning orientation (0° or 90° to the longitudinal axis), line-to-line spacing (line pitch), number of scan lines(N), scan band size, initial material stress conditions on the working surface of the slider and any interactions between these variables. Since measuring device 111 is assumed to be gage capable and produces accurate and repeatable measurements, it is not included as an input variable to the model.

For better process control, some of these input variables may be preferred as process control inputs over other input variables. Also, the process model can be simplified by assuming that some of these input variables are constant, or at least within a certain range, so that they may be eliminated from the model. A description of each of these input variables is described below.

a. Laser Operating Mode

Light source 112 can be operated in a continuous wave mode or a pulsed mode. These modes produce different curvature responses. In the continuous wave mode, a laser beam having a wavelength in the infrared range would provide enough heating of the slider surface without material removal. In contrast, if light source 112 were operated in the pulsed mode, each pulse would require a high-peak power (energy sustained over a very short period of time (ns)) in order to produce measurable amounts of desired curvature change. This would typically result in deeper laser pockets and a smaller heat-effected zone, which would result in smaller induced tensile stresses as compared to the tensile stresses induced by a continuous wave laser beam. The laser spots could be pulsed at a high frequency to produce a continuous-like burn line, but such a line can suffer from internal cracks that can cause a relief in the induced tensile stresses and therefore, a smaller curvature change.

According to one specific example of the present invention, light source 112 delivers continuous-wave laser beam having a power of about 5 watts and a wavelength around 1100 nm. This laser beam is used to scan a burn line that has a melting penetration depth (MPD), which is ten times smaller than that obtained with a pulsed laser being scanned at the same speed. Such scan lines obtained with a continuous wave laser beam are virtually crack-free and result in at least a 50% increase in resulting curvature change over a pulsed laser. Another advantage of a continuous wave laser beam is that a continuous wave laser beam has greater power stability as compared to the pulse-to-pulse energy fluctuations of a pulsed laser, even when the pumping method is the same. Power stability directly influences the accuracy of curvature response models and hence, the predictability of the process.

b. Focused Spot Size

Figure 10:
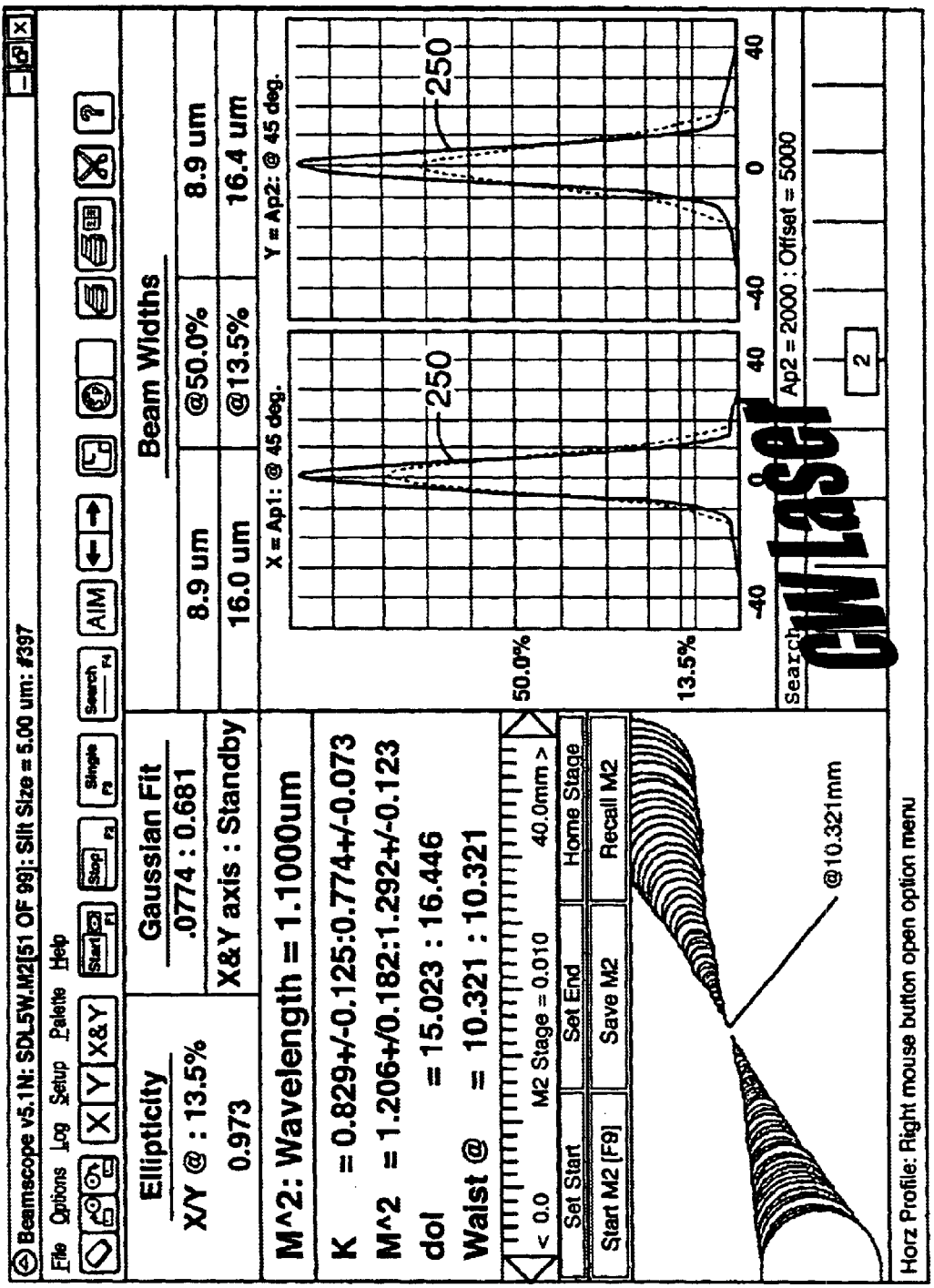
FIGS. 10 and 11 are charts illustrating a spot size profiles of a continuous wave laser beam and a pulsed laser, respectively, with both beams being focused through the same objective lens.
Figure 11:
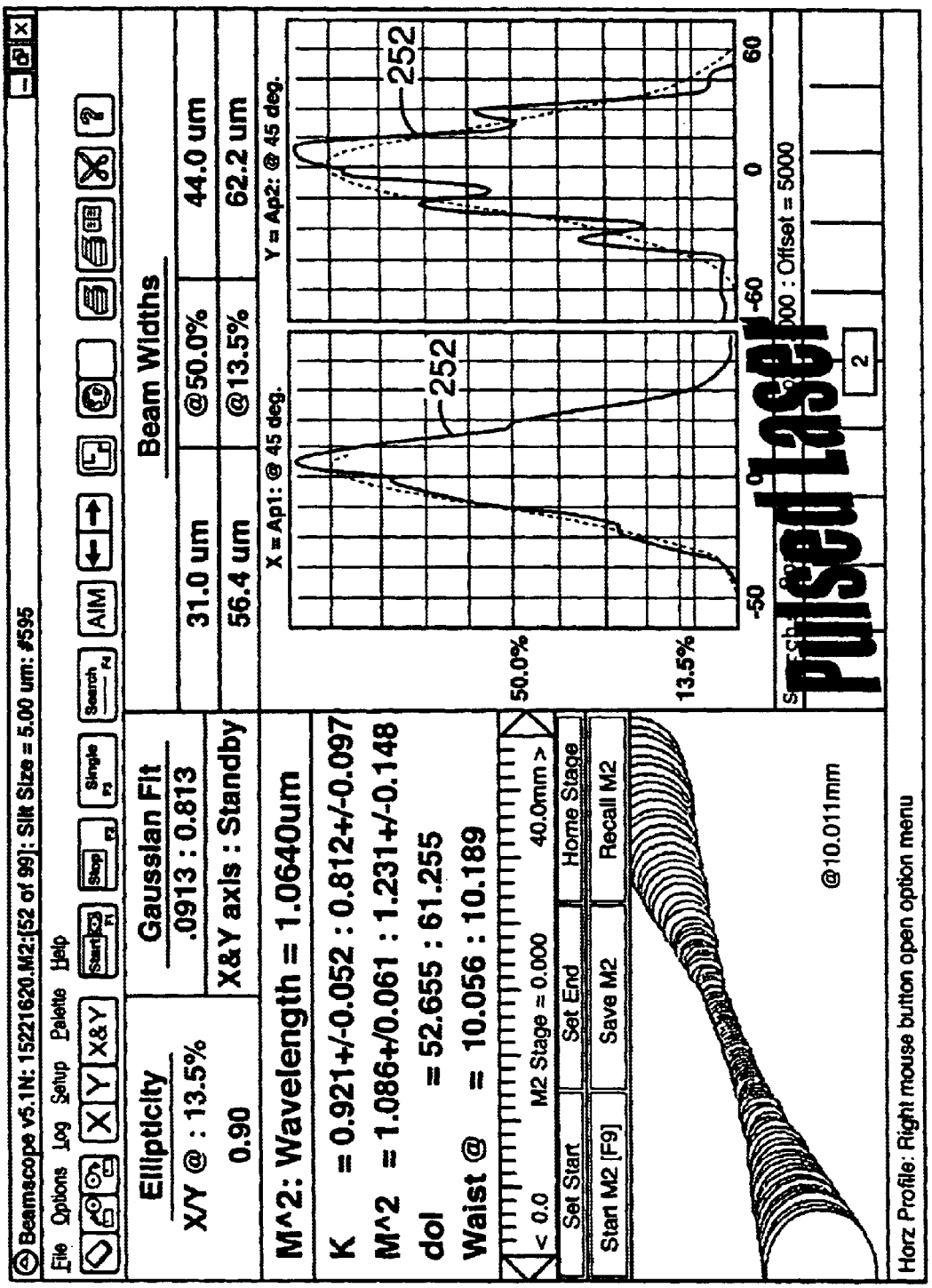

Due to the fact that curvature response sensitivity is a function of the scan line location, small steps in curvature change (i.e. high resolution) can be accomplished by using narrow and well defined scan lines that can realize very localized compressive stress removal and tensile stress addition. The focused laser spot size on the working surface of the slider, combined with the laser power, determines the width of the burn scan line and the melting penetration depth. The smaller the focused spot size, the narrower the scan line. With a narrower scan line, less laser power is required. FIGS. 10 and 11 are charts illustrating a spot size profile 250 of a continuous wave laser beam and a spot size profile 252 of a pulsed laser, respectively, with both beams being focused through the same objective lens. The spot size profile of the continuous wave laser beam is much more well defined than that of the pulse laser. The focused spot size of a continuous wave can therefore be used as a process control input, but is less preferred since variations in the spot size result in variations in the power density (power per unit area) and hence variations in the design curve.

c. Laser Power

The laser power is another process control input that can be used to control the crown and cross curvature. By applying higher power, a higher curvature response is obtained. However, changing the laser power results in a power density change. Therefore, the effects on the design curve due to laser power variations are similar to those seen with spot size variations. Also, the curvature response is saturated at higher power levels and is zero at lower power levels. This limits the range over which this variable is effective in controlling the process. In addition, at moderate power levels, a curvature change may not occur with every unit of power increase. Larger power level steps are required to induce a curvature change. Since the use of laser power as a curvature control input may not produce an accurate curvature model, power is fixed in a one embodiment of the present invention.

d. Scanning Speed

Scanning speed is the speed at which scanner 116 (shown in FIG. 4) moves beam 120 over the slider surface being treated. Higher scanning speeds normally result in a smaller curvature responses and vice-versa. Since this variable affects the line characteristics, similar to the laser spot size and laser power variables, this variable is not used as a process control input in one embodiment of the present invention.

e. Scanning Orientation

As described above with reference to FIGS. 7 and 8, scanning is mostly done in a direction parallel to the transverse axis of the slider body. Scanning in this direction offers higher changes in cross curvature than scanning in a direction parallel to the slider's longitudinal axis. Scanning in a direction parallel to the longitudinal axis is done for fine crown curvature adjustments during the second adjustment step described in the flow chart of FIG. 9. For simplicity, this orientation is assumed to be fixed and is not used as a variable in the design model.

f. Pre-stress Conditions.

The initial stress conditions of the slider prior to laser heat treatment can influence the absolute outcome of the crown and cross curvatures, but does not influence the relative changes in crown and cross curvature. Since the pre-stress conditions do not affect the model behavior, these variables are not included in the design model.

The initial stress conditions are a direct result of the row slice process. Pre-stress conditions cause a scaling of the magnitude of the desired change, but not the slope of the change. Generally, the majority of sliders (e.g., 95%) in a typical fabrication process have stress conditions that are similar to one another. Variations in the initial stress conditions can be absorbed to a large extent by the curvature control process of the present invention, and are therefore not accounted for in the design model. However, these variations can be included in the model if tighter specifications are desired. Moreover, the use of two separate coarse and fine curvature adjustment steps greatly dilutes the negative effects of row slice stress variations.

g. Line-to-Line Spacing (P), Number of Lines (N), and Scan Band Size (B).

The scan band size B is an integration of both the line-to-line spacing P and the number of scan lines N in the band. Thus, the scan band size is given by:

$$B = P \times (N-1) \qquad \text{Eq. 1}$$

The maximum size of the individual crown and cross curvature adjustment bands is determined by the laser scan burn patterns defined above. Therefore, the band size B in Eq. 1 can have different maximum values depending on the particular burn pattern selected. From Eq. 1, various embodiments are possible.

In one embodiment, the band size is fixed to a maximum, and either P or N (but not both) is used as the process input variable in the mathematical prediction model. Having both P and N as independent input variables results in values of P and N that do not satisfy the above equation and the condition B being fixed. This means that if P is allowed to vary, then N will be deduced from Eq. 1 and vice-versa. With this embodiment, respective bands of the burn pattern will always originate and terminate at the same locations on the surface being treated.

In another embodiment, N is fixed and B or P is allowed to vary. With this embodiment, there are several possible configurations. In one configuration, the band will always start at a first end (such as an outer limit) of the designated area of the burn pattern and subsequent scan lines in the band progress towards the other end (such as the inner limit) of the designated area. The band will have a fixed number of scan lines, but the line spacing or pitch "P" differs from one slider to the next. In another configuration, the band always starts at the second end (such as the inner limit) of the designated area and progresses towards the first end, (such as the outer limit). In yet another configuration, the band will always start with a scan line at a central location within the designated area and progress alternately toward both the inner and outer limits.

In another embodiment, P is fixed and N or B is used as the process input variable. The same band configurations discussed above also apply to this embodiment. With this embodiment scan lines will always be spaced the same distance apart, from one slider to the next. In yet another embodiment, a burn pattern may be formed by various combinations of each of the embodiments and configurations discussed above.

In view of the physical dimensions of the slider and the anisotropic nature of the row slice stresses on the surface being treated, one specific embodiment of the present invention uses the number of scan lines, N, as the sole process input variable. The line-to-line spacing, P, is fixed, and the scan band size, B, varies proportionally with N. All bands on the burn pattern shown in FIGS. 7 and 8 start from the outer limit and grow toward the inner limit of the designated area on the pattern with each successive scan line, with the exception of the coarse crown band. The coarse crown band starts at a center location on the slider surface being treated and progresses alternatively toward the outer limits of the coarse crown band area.

Figure 12:
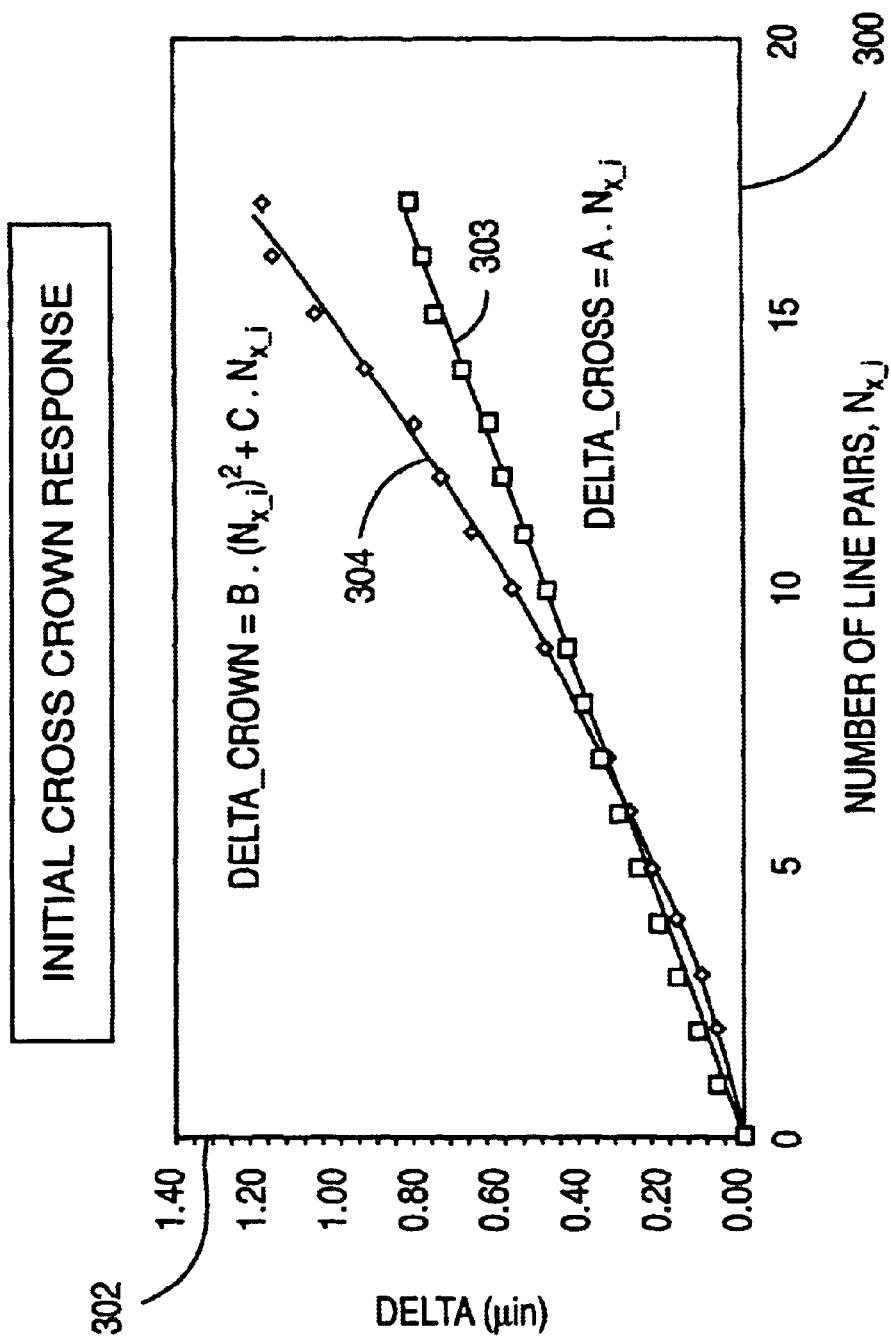
FIG. 12 is a graph illustrating initial curvature change as a result of progressively increasing a number of equidistant scan lines within coarse cross bands shown in FIG. 8.

6. Mathematical Model for Curvature Response Where the Number of Scan Lines N is the Sole Input Variable a. Coarse Adjust During the initial coarse curvature adjustment steps, laser scan lines are formed in the coarse crown and coarse cross curvature bands. FIG. 12 is a graph illustrating the initial curvature response as a result of progressively increasing the number of equidistant scan lines within the coarse cross bands 212 and 214 shown in FIG. 8. In the coarse cross bands, $N_{x\_i}$, represents the number of pairs of scan lines being put symmetrically in bands 212 and 214 and is the input variable for the initial cross curvature change estimation. X-axis 300 represents the number of scan line pairs $N_{x\_i}$, and Y-axis 302 represents the change in curvature in microinches. Line 303 represents the change in cross curvature, and line 304 represents the change in crown curvature. During the initial cross curvature adjustment step, the change in cross curvature is accompanied by a change in crown curvature. This is due to these parameters being coupled to one another within coarse adjust area 200 shown in FIG. 7. Line 303 can be approximated by $A \cdot N_{x\_i}$, where A is a constant. Line 304 can be approximated by $B \cdot (N_{x\_i})^2 + C \cdot N_{x\_i}$, where B and C are constants.

Figure 13:
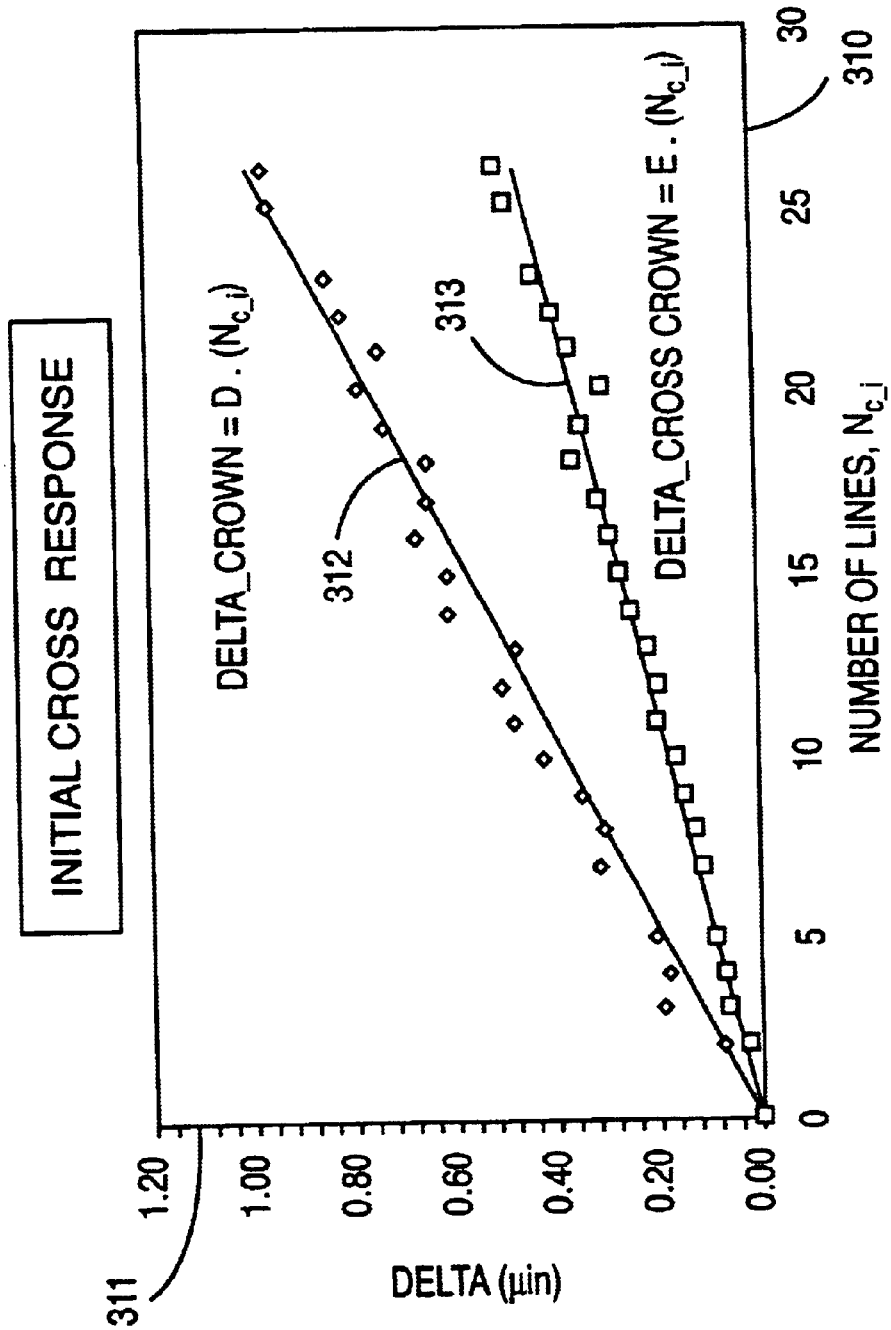
FIG. 13 is a graph illustrating initial curvature change as a result of progressively increasing a number of scan lines within a coarse crown band shown in FIG. 8.

FIG. 13 is a graph illustrating the curvature change as a result of increasing the number, $N_{c\_i}$, of scan lines placed within coarse crown band 210 (shown in FIG. 8). X-axis 310 represents the number of scan lines placed in coarse crown band 210, and Y-axis 311 represents the curvature change in microinches. Line 312 represents the resulting change in crown curvature, and line 313 represents in the resulting change in cross curvature. Line 312 can be approximated by $D \cdot N_{c\_i}$, where D is a constant. Line 313 can be approximated by $E \cdot N_{c\_i}$, where E is a constant. As can be seen in FIG. 13, the initial change in crown curvature is accompanied by an initial change in cross curvature.

Since the change in cross curvature and the change in crown curvature are coupled to one another within coarse adjust area 200, the values of $N_{x\_i}$ and $N_{c\_i}$ can be solved for simultaneously using superposition. The overall crown and cross curvature responses can therefore be modeled as:

$$\Delta C_i = B \cdot N^2_{x\_i} + C \cdot N_{x\_i} + D \cdot N_{c\_i} \qquad \text{Eq. 2}$$

$$\Delta X_i = A \cdot N_{x\_i} + E \cdot N_{c\_i} \qquad \text{Eq. 3}$$

where $\Delta C_i$ and $\Delta X_i$ are the desired initial changes in crown and cross curvatures, respectively. Given the desired initial changes in crown and cross curvature, the above equations are solved for the input variables $N_{x\_i}$ and $N_{c\_i}$. These variables are then used to select the number of scan lines that are placed in coarse crown adjust band 210 and coarse cross bands 212 and 214 to effect the desired initial curvature change.

b. Fine Adjust

Figure 14:
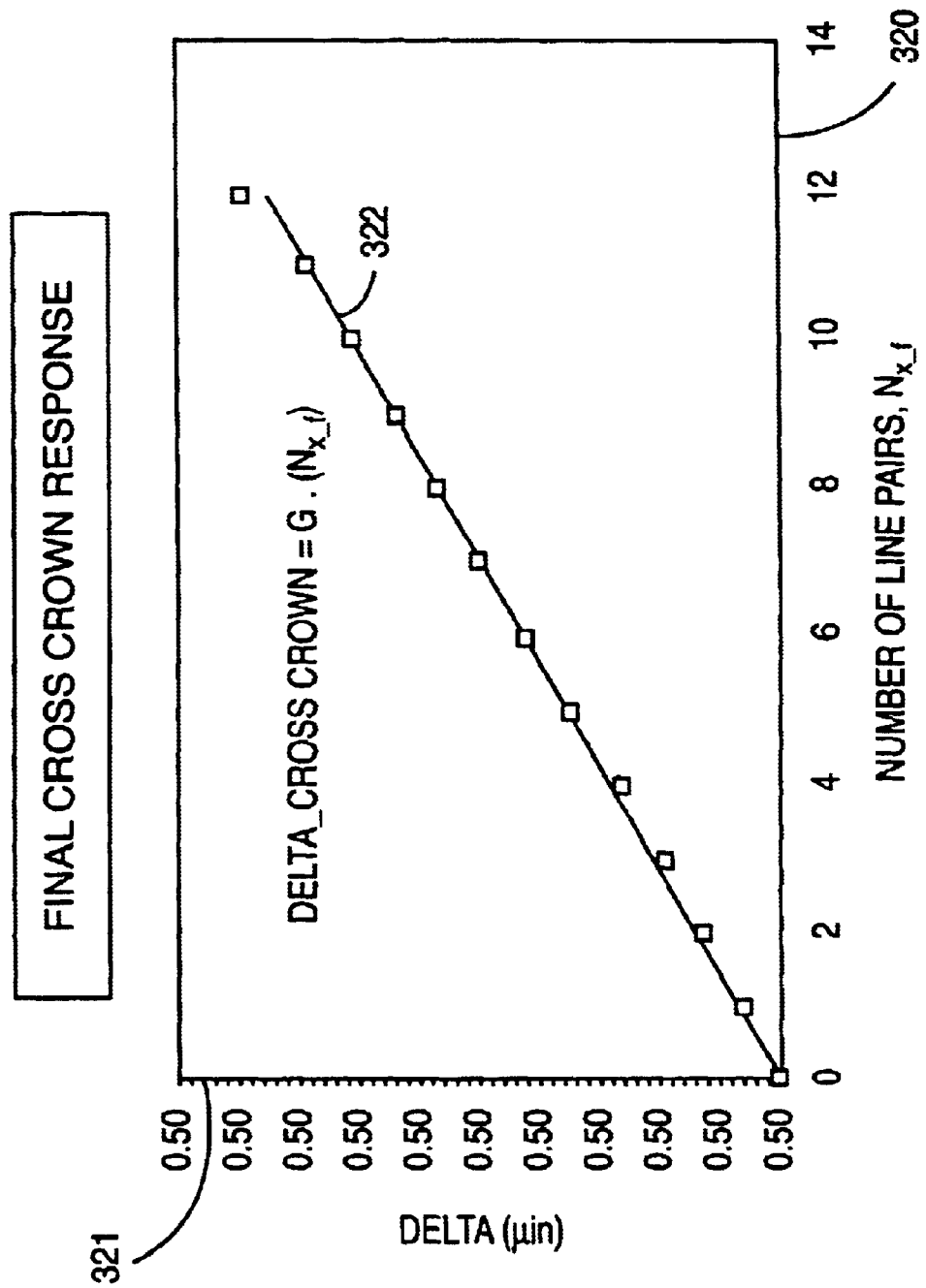
FIGS. 14 and 15 are graphs showing final curvature changes as a result of progressively increasing a number of scan lines within fine cross bands and fine crown bands, respectively, shown in FIG. 7.

During the fine curvature adjustment step, laser scan lines are formed in the fine cross bands 202 and 204 and fine crown bands 206 and 208 (shown in FIG. 7). FIG. 14 is a graph showing the final cross curvature response. X-axis 320 represents the number of line pairs, $N_{x\_f}$, placed symmetrically within fine cross bands 202 and 204, and Y-axis 321 represents the resulting curvature change in microinches. Line 322 represents an approximation of the resulting change in cross curvature. This change can be approximated by $G \cdot N_{x\_f}$, where G is a constant.

Figure 15:
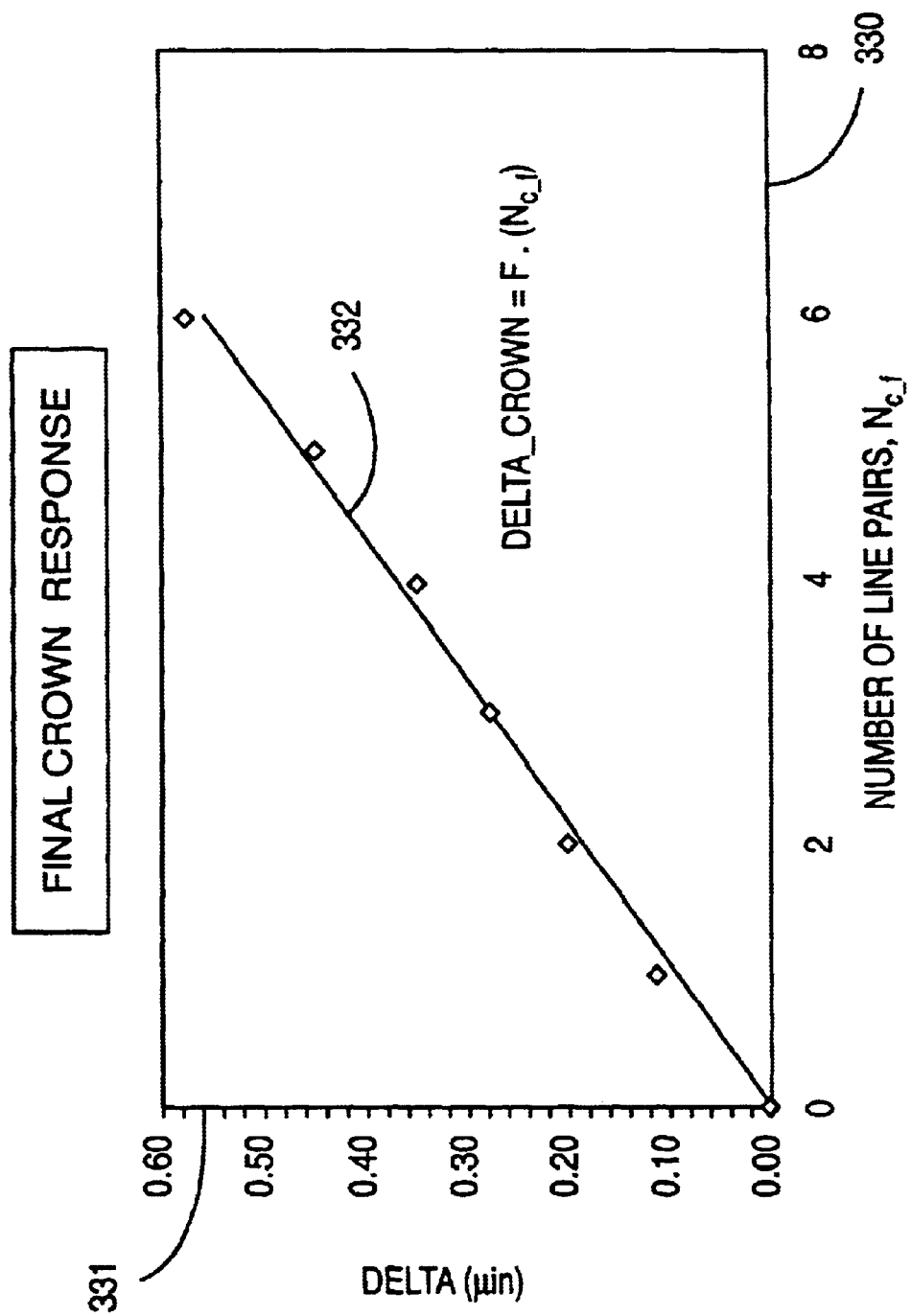

FIG. 15 is a graph illustrating the final crown curvature response. X-axis 330 represents the number of line pairs $N_{c\_f}$, placed symmetrically within the fine crown bands 206 and 208, and Y-axis 331 represents the resulting curvature change in microinches. Line 332 represents the final crown curvature change, which can be approximated by $H \cdot N_{c\_f}$, where H is a constant.

During the final curvature adjust steps, the cross curvature change is not accompanied by a crown curvature change, and the crown curvature change is not accompanied by a cross curvature change. This is due to these parameters being de-coupled from one another in the fine cross and crown bands. Therefore, $N_{c\_f}$ and $N_{x\_f}$ can be solved for separately using the following equations:

$$\Delta C_f = F \cdot N_{c\_f} \qquad \text{Eq. 4}$$

$$\Delta X_f = G \cdot N_{x\_f} \qquad \text{Eq. 5}$$

where $\Delta C_f$ and $\Delta X_f$ are the desired final changes in crown and cross curvature values, respectively. The solutions obtained from the above equations will provide the number of scan lines required in the fine crown and cross bands in order to obtain the desired final changes in crown and cross curvature.

7. Summary

Curvature adjustment apparatus 110 shown in FIG. 4 implements a process where a flatness parameter, such as crown and cross curvature, of a disc head slider can be independently adjusted from an incoming pre-process value to an outgoing desired specification. The apparatus uses a high quality focused continuous wave laser beam for treating specific regions of the surface of the slider under treatment. The combination of using very narrow and well defined laser marks and properly defined treatment regions on the slider surface provides for improved resolution and accuracy in obtaining desired crown and cross curvature targets. The process also includes a two-step control sequence that lessens the effects of upstream process variations. Accurate modification of slider curvature is realized by virtue of very localized stress management techniques that are capable of decoupling individual crown and cross curvatures to allow both parameters to reach their design specifications simultaneously.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, other methods of producing localized heating of the slider substrate material to alter stresses in the material surface can also be used with the present invention. The surface stresses can also be altered with techniques other than the use of heat, such as lapping, shot pinning, sand blasting, liquid honing, etc.

What is claimed is:

1. A method of controlling cross and crown curvatures of a bearing surface of a disc head slider, the method comprising:
   (a) obtaining a measure of the cross and crown curvatures;
   (b) selectively altering material stresses in a working surface of the slider within an independent cross curvature adjust area based on the measure of the cross curvature;
   (c) defining the independent cross curvature adjust area such that step (b) induces a change in the cross curvature while inducing substantially no change in the crown curvature;
   (d) selectively altering the material stresses in the working surface within an independent crown curvature adjust area, which is isolated from the independent cross curvature adjust area, based on the measure of the crown curvature; and
   (e) defining the independent crown curvature adjust area such that step (d) induces a change in the crown curvature while inducing substantially no change in the cross curvature.

2. The method of claim 1 wherein:
   step (b) comprises selectively scanning a laser beam spot along the working surface of the slider to form at least one laser scan line within the independent cross curvature adjust area; and
   step (d) comprises selectively scanning a laser beam spot along the working surface of the slider to form at least one laser scan line within the independent crown curvature adjust area.

3. The method of claim 2 wherein steps (b) and (d) further comprise selectively scanning a continuous wave laser beam spot along the working surface of the slider such that substantially no material is removed from the working surface.

4. The method of claim 2 wherein the working surface of the slider has a leading edge, a trailing edge, first and second side edges, a longitudinal axis and a transverse axis and wherein:
   step (c) of defining the independent cross curvature adjust area comprises defining first and second rectangular independent cross curvature adjust bands on the working surface, which are positioned along the leading and trailing edges, respectively, and have a long axis parallel to the transverse axis and a short axis parallel to the longitudinal axis;
   step (e) of defining the independent crown curvature adjust area comprises defining first and second rectangular independent crown curvature adjust bands on the working surface, which are positioned along the first and second side edges, respectively, and have a long axis parallel to the longitudinal axis and a short axis parallel to the transverse axis; and
   the independent cross and crown curvature adjust bands are isolated from one another and peripheral to a central area of the working surface.

5. The method of claim 4 wherein:
step (b) of selectively scanning a laser beam spot comprises selectively forming a first number of laser scan lines within each of the first and second cross curvature adjust bands, which are parallel to the transverse axis; and
step (d) of selectively scanning a laser beam spot comprises selectively forming a second number of laser scan lines within each of the first and second crown curvature adjust bands, which are parallel to the longitudinal axis.

6. The method of claim 5 wherein:
step (b) further comprises selecting a value for the first number as a function of the measure of the cross curvature, wherein the first number of scan lines are spaced apart from one another within each of the cross curvature adjust bands by a first fixed distance, which is independent of the measure of the cross curvature; and
step (d) further comprises selecting a value for the second number as a function of the measure of the crown curvature, wherein the second number of scan lines are spaced apart from one another within each of the crown curvature adjust bands by a second fixed distance, which is independent of the measure of the crown curvature.

7. The method of claim 5 wherein:
step (b) further comprises spacing the first number of scan lines apart from one another within each of the cross curvature adjust bands by a first distance, which is a function of the measure of the cross curvature; and
step (d) further comprises spacing the second number of scan lines apart from one another within each of the crown curvature adjust bands by a second distance, which is a function of the measure of the crown curvature.

8. A disc head slider fabricated according to the method of claim 5 and comprising the first number of laser scan lines formed within each of the first and second independent cross curvature adjust bands and the second number of laser scan lines formed within each of the first and second crown curvature adjust bands.

9. The method of claim 1 and further comprising:
(f) selectively altering material stresses in the working surface of the slider within an initial, dependent curvature adjust area based on the measure of the cross and crown curvatures, prior to performing steps (b) and (d), wherein the initial, dependent curvature adjust area is isolated from the independent cross and crown curvature adjust areas; and
(g) defining the initial, dependent curvature adjust area such that changes in material stresses in step (f) which induce a change in the cross curvature are accompanied by a change in the crown curvature, and changes in material stresses in step (f) which induce a change in the crown curvature are accompanied by a change in the cross curvature.

10. The method of claim 9 wherein the initial, dependent curvature adjust area is defined in the central area of the working surface, and the independent cross and crown curvature adjust areas are defined in a peripheral area of the working surface, which surrounds the central area.

11. The method of claim 10 wherein the working surface of the slider has a leading edge, a trailing edge, a slider length from the leading edge to the trailing edge, a longitudinal axis and a transverse axis wherein the step (g) of defining the initial, dependent curvature adjust area comprises:

(g)(1) defining a rectangular dependent crown curvature adjust band on the working surface, which is positioned at a midpoint along the slider length; and
(g)(2) defining first and second rectangular dependent cross curvature adjust bands on the working surface, which are positioned within the central area on respective sides of the dependent crown curvature adjust band, between the dependent crown curvature adjust band and the leading and trailing edges.

12. The method of claim 11 wherein step (f) comprises:
(f)(1) selectively 2 scanning a laser beam spot along the rectangular dependent crown curvature adjust band to form a first number of laser scan lines within the dependent crown curvature adjust band, which are parallel to the transverse axis, as a function of the measure of the crown curvature and the cross curvature; and
(f)(2) selectively scanning the laser beam spot along each of the first and second rectangular dependent cross curvature adjust bands to form a second number of laser scan lines within each of the first and second dependent crown curvature adjust bands, which are parallel to the transverse axis, as a function of the measure of the cross curvature and the crown curvature.

13. The method of claim 9 wherein the step (a) of obtaining a measure of the cross and crown curvatures comprises:
(a)(1) obtaining a first measure of the cross and crown curvatures prior to selectively altering material stresses in steps (b), (d) and (f);
(a)(2) obtaining a second measure of the cross and crown curvatures after selectively altering material stresses in step (f) and prior to selectively altering material stresses in steps (b) and (d);
wherein the material stresses are altered in step (f) as a function of the first measure of the cross and crown curvatures;
wherein the material stresses are altered in step (b) as a function of the second measure of the cross curvature; and
wherein the material stresses are altered in step (d) as a function of the second measure of the crown curvature.

14. A method of adjusting cross and crown curvatures on a bearing surface of a disc head slider, which has a back surface opposite to the bearing surface with leading and trailing edges, first and second side edges, a longitudinal axis and a transverse axis, the method comprising:
(a) obtaining a measure of the cross and crown curvatures;
(b) selectively forming a first number of laser scan lines on the back surface, parallel to the transverse axis and within each of first and second rectangular cross curvature adjust bands as a function of the measure of the cross curvature;
(c) defining the first and second rectangular cross curvature adjust bands along the leading and trailing edges, respectively, of the working surface and peripheral to a central area of the working surface;
(d) selectively forming a second number of laser scan lines on the back surface, parallel to the longitudinal axis and within each of first and second rectangular crown curvature adjust bands as a function of the measure of the crown curvature; and
(e) defining the first and second rectangular crown curvature adjust bands along the first and second side edges, respectively, of the working surface and peripheral to the central area of the working surface.

15. The method of claim 14 and further comprising:

(f) obtaining a first measure of the cross and crown curvatures within step (a);

(g) selectively forming a third number of laser scan lines on the back surface, parallel to the transverse axis and within the central area as a function of the first measure of the cross and crown curvatures, prior to performing steps (b) and (d);

(h) obtaining a second measure of the cross and crown curvatures within step (a) after performing step (g);

(i) selectively forming the first number of laser scan lines in step (b) after performing step (h) and as a function of the second measure of the cross curvature obtained in step (h); and (j) selectively forming the second number of laser scan lines in step (d) after performing step (h) and as a function of the second measure of the crown curvature obtained in step (h).

16. An apparatus for controlling cross and crown curvatures of a bearing surface of a disc head slider, the apparatus comprising:

a light source adapted to produce a continuous wave light beam capable of altering material stresses in a working surface of the slider while removing substantially no material from the working surface; and means for scanning the light beam cross the working surface in a pattern selected to alter material stresses in the working surface within a cross curvature adjust area so as to induce a change in the cross curvature while inducing substantially no change in the crown curvature and within a crown curvature adjust area on the working surface so as to induce a change in the crown curvature while inducing substantially no change in the cross curvature.

17. A method of controlling cross and crown curvatures of a substrate material, the method comprising:

(a) obtaining a measure of the cross and crown curvatures;

(b) selectively altering material stresses in a working surface of the substrate material within an independent cross curvature adjust area based on the measure of the cross curvature;

(c) defining the independent cross curvature adjust area such that step (b) induces a change in the cross curvature while inducing substantially no change in the crown curvature;

(d) selectively altering the material stresses in the working surface within an independent crown curvature adjust area, which is isolated from the independent cross curvature adjust area, based on the measure of the crown curvature; and (e) defining the independent crown curvature adjust area such that step (d) induces a change in the crown curvature while inducing substantially no change in the cross curvature.

* * * * *

UNITED STATES PATENT AND TRADEMARK OFFICE
CERTIFICATE OF CORRECTION

PATENT NO. : 6,662,069 B1
APPLICATION NO. : 09/579316
DATED : December 9, 2003
INVENTOR(S) : Mohamed-Salah H. Khlif It is certified that error appears in the above-identified patent and that said Letters Patent is hereby corrected as shown below:

Column 18
Line 11, delete "2".

Signed and Sealed this

Tenth Day of November, 2009

David J. Kappos
*Director of the United States Patent and Trademark Office*